United States Patent
Jania et al.

(10) Patent No.: US 7,509,382 B1
(45) Date of Patent: Mar. 24, 2009

(54) SYSTEM AND METHOD TO DEFLECT EMAIL THREADS TO A BLOGGING SYSTEM

(75) Inventors: Frank L. Jania, Chapel Hill, NC (US); Timothy G. Shortley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/110,588

(22) Filed: Apr. 28, 2008

(51) Int. Cl.
G06F 15/16 (2006.01)
G06F 12/00 (2006.01)

(52) U.S. Cl. ........................ 709/206; 709/207
(58) Field of Classification Search ................ 709/203, 709/206, 207, 217, 218, 250
See application file for complete search history.

(56) References Cited

U.S. PATENT DOCUMENTS

| | | | | |
|---|---|---|---|---|
| 5,809,512 | A | * | 9/1998 | Kato ........................ 715/207 |
| 2002/0169835 | A1 | * | 11/2002 | Paul et al. .................... 709/206 |
| 2006/0248065 | A1 | * | 11/2006 | Koll ............................ 707/3 |
| 2006/0253537 | A1 | * | 11/2006 | Thomas ...................... 709/206 |
| 2007/0055731 | A1 | | 3/2007 | Thibeault |
| 2007/0156824 | A1 | | 7/2007 | Thompson |
| 2008/0052634 | A1 | * | 2/2008 | Fishkin et al. ............... 715/753 |
| 2008/0147810 | A1 | | 6/2008 | Kumar et al. |

FOREIGN PATENT DOCUMENTS

WO    WO0152161    7/2001

* cited by examiner

Primary Examiner—Zarni Maung
(74) Attorney, Agent, or Firm—Cantor Colburn LLP; Daniel McLoughlin

(57) ABSTRACT

A method for deflecting threaded email discussions to message forums includes providing a first user operating an email client application to send a first email message addressed to one or more recipient users with a first option to designate the first email message for posting to a message forum hosted by a messaging forum server; accessing the messaging forum server to post a content of the first email message to the message forum if the first user has sent the first email message with the first option selected; formatting the first email message to append a hyperlink to the message forum and a hyperlink to a comment feed syndicated for the message forum; routing the first email message for delivery to the one or more recipient users including a second user operating the email client application; providing the second user with a second option to designate a second email message composed in reply to the first email message for posting to the message forum if the first user has sent the first email message with the first option selected; and accessing the messaging forum server to post a content of the second email message to the message forum as a comment if the second user has sent the second email message with the second option selected.

1 Claim, 3 Drawing Sheets

SYSTEM AND METHOD TO DEFLECT EMAIL THREADS TO A BLOGGING SYSTEM

BACKGROUND OF THE INVENTION

1. Field of the Invention

Exemplary embodiments of the present invention relate to electronic messaging, and more particularly, to threaded group electronic communication.

2. Description of Background

In computer communication networks, one method of communication is electronic mail (email), in which a sending user prepares and sends a message over some form of computer network to a receiving user, usually on a remote system. Most email client applications, which are front-end computer programs that are typically used to maintain a message list identifying messages received for reading and processing by the recipient, also provide software to facilitate writing, replying to, forwarding, deleting, and filing emails. Email messages can either be sent to a single recipient or to a group to many people at once, by specifying several recipient addresses. This facilitates group communication, because each recipient can then do a group reply to send a response to each of the people who were sent the original message.

Email has become a ubiquitous means of communication for both business and personal use, and an active email user sends and receives a number of messages in any given day. Some messages that are received are junk mail that can be discarded unread, some are urgent alerts to be dealt with immediately, and other messages are pushed aside until the user has spare time available to read them. Nevertheless, many people become overloaded with more email messages than they have time to respond to, which can have the effect of disrupting workflow and efficiency.

A number of solutions have been proposed to address the problem of email overload. One area of interest is that of an electronic message forum. While email is a more formal form of communication that is suited for one-on-one communication or for initial information distribution to a group in a one-to-many fashion, it is not as useful for group discussions. The messages in a group email discussion are individual items that are not connected, which presents lost opportunity to track and analyze messages. Electronic message forums that aid users by visually grouping messages such as web logs (or "blogs"), as well as bulletin boards, newsgroups, and Internet forums, are better suited for aggregating distributed, electronic group communications into topic threads. In general, such forums are hosted at a website by a web server, and enable users to post a message that can be viewed by others who visit the web site by typing the message and uploading to the forum server. Users generally rely on text, although it is possible to insert images, media, links and other content. It is common practice to allow posters to view and read messages from others, to post replies or comments, and to create a topic that others can post replies to. Messaging forums may be conducted to be available to the general public, or they may have restricted access. For example, some messaging forums require individuals to create an account, and to login before posting a message. These applications present alternatives to disseminating information to groups and facilitating group communication on a topic that do not lead to email clutter.

Nevertheless, because of the present omnipresence of email as an electronic information dissemination and communication medium, a switch from email usage to usage of electronic message forums such as blogs presents a cultural shift barrier providing few technological solutions.

SUMMARY OF THE INVENTION

The shortcomings of the prior art can be overcome and additional advantages can be provided through exemplary embodiments of the present invention that are related to a method for deflecting threaded email discussions to electronic message forums. The method comprises providing a first user, the first user operating an email client application to send a first email message addressed to one or more recipient users, with a first option to designate the first email message for posting to an electronic message forum hosted by a messaging forum server. The first option is provided through a user interface implemented within the email client application. The one or more recipient users includes a second user operating the email client application. The method further comprises accessing the messaging forum server to post a content of the first email message to the electronic message forum if the first user has sent the first email message with the first option selected; formatting the first email message to append a hyperlink to the electronic message forum and a hyperlink to a comment feed syndicated for the message forum; and routing the first email message for delivery to the one or more recipient users; providing the second user with a second option to designate a second email message composed in reply to the first email message for posting to the electronic message forum if the first user has sent the first email message with the first option selected. The second option is provided through a user interface implemented within the email client application upon receipt of the first email message by the second user. The method further comprises accessing the messaging forum server to post a content of the second email message to the electronic message forum as a comment if the second user has sent the second email message with the second option selected.

The shortcomings of the prior art can also be overcome and additional advantages can also be provided through exemplary embodiments of the present invention that are related to computer program products, and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of exemplary embodiments of the summarized invention, technically we have achieved a solution that can be implemented within a distributed client/server environment to provide a mechanism promoting dissemination of information to a group and subsequent group communication by facilitating a shift from the use of email communications to the use of collaborative messaging forums, such as blogs, for threaded discussions. Exemplary embodiments of the present invention can be implemented to provide improved functionality within such an environment that permits users to deflect group email communication threads to a collaborative messaging forum, such as a blogging system.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

Figure 1:
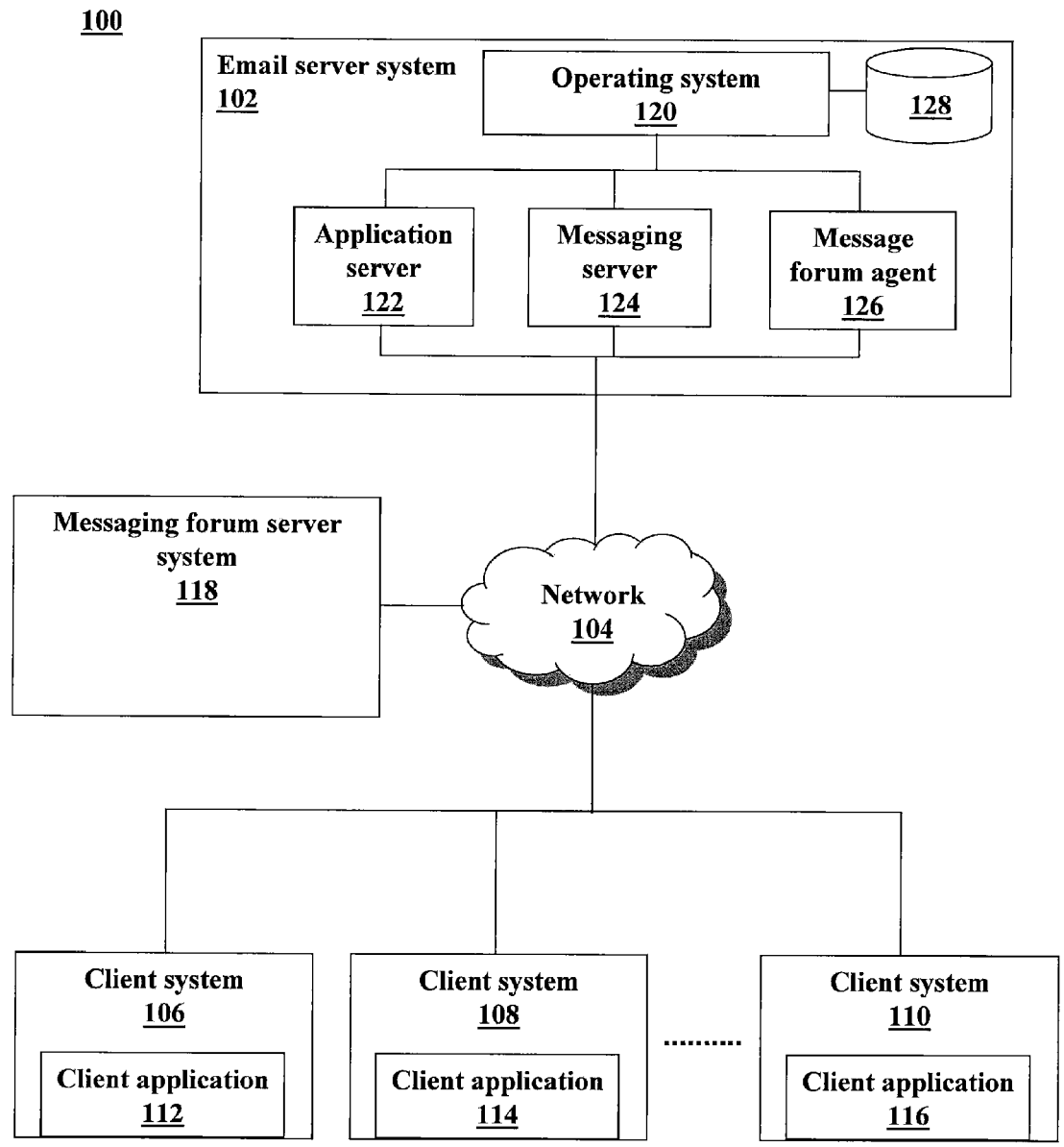
FIG. 1 is a block diagram illustrating an exemplary distributed processing system within which exemplary embodiments of the present invention can be implemented.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented within a distributed client/server environment to provide a mechanism promoting dissemination of information to a group and subsequent group communication by facilitating a shift from the use of email communications to the use of collaborative messaging forums, such as blogs, for threaded discussions. Exemplary embodiments can be implemented within an architecture that may include an email host system that includes at least one mail server, multiple clients, and software that allows users of the multiple clients to communicate with each other via email messages exchanged using the email host system. Exemplary embodiments of the present invention can be implemented to provide improved functionality within such an environment that permits users to deflect group email communication threads to a collaborative messaging forum, such as a blogging system. In the exemplary embodiments, a messaging forum server that is associated with the email host system can provide the collaborative messaging forum. Alternatively, a messaging forum server that is a separate entity external to the email host system can provide the collaborative messaging forum.

As used herein, an electronic message forum includes any online forum in which an individual can create or specify content and have that content rendered for any member of the public, or any member of a class of individuals, who can access the online forum. Electronic forums may employ templates, guidelines and enable individuals to include different kinds of functionality. In general, such forums are hosted at a web site, and enable individuals to post a message that can be viewed by others who visit the web site. It is common practice to allow posters to view and read messages from others, to post replies to messages, and to create a topic to which others can post replies. Messaging forums may be conducted to be available to the general public, or they may have restricted access. For example, some messaging forums require individuals to create an account, and to login before posting a message. Specific examples of online message forums include message boards on which opinions are posted, "electronic classifieds", online auctions, blog commentaries, and online reviews.

Referring now to FIG. 1, a distributed processing environment 100 within which exemplary embodiments of the present invention can be implemented is illustrated. Exemplary distributed processing environment 100 includes an email server system 102, an electronic messaging forum server system 118, and a number of client systems or platforms 106, 108, 110 operatively connected to email server system 102 via a communications link or network 104. Hereinafter, the term "email" refers to various kinds of electronic mail. For example, the email may be a text email, a voice email, a video email, or the like. It should be noted that the present exemplary embodiment is non-limiting. Exemplary embodiments of the present invention can be implemented in email systems that include any number of email servers, any number of messaging forum servers, and any number of email clients operatively connected together via a network. In exemplary embodiments, the server(s) and the client(s) can communicate with each other following a client-server model and rely on the Transmission Control Protocol (TCP) for reliable delivery of information or applications between servers and client applications. Furthermore, although email server system 102 and messaging forum server system 118 are shown as separate entities connected to network 104 in this example, it shall be understood that any combination of the servers and or the functionality provided by the servers may be integrated.

In exemplary embodiments, network 104 may be any suitable network type, such as, for example, personal area network (PAN), local area network (LAN), wide area network (WAN), circuit switched network, packet switched network, wired network, wireless network, broadcast network, or a point-to-point network, or combinations thereof, and the network may also utilize any suitable hardware technology to connect devices such as, for example, optical fiber, Ethernet, ISDN (Integrated Services Digital Network), T-1 or T-3 link, FDDI (Fiber Distributed Data Network), cable or wireless LMDS network, Wireless LAN, HomePNA, Power line communication, or telephone line network.

Each of client platforms 106, 108, 110 is a user terminal or other client system or device implementing software for and running a respective email client application (that is, 112, 114, 116). In exemplary embodiments, each of client platforms 106, 108, 110 may be a personal computer system or a non-traditional-computer digital device such as a personal digital assistant, a pager, a cellular phone, and the like. Client platforms 106, 108, 110 may be implemented with various peripheral devices, such as a display, one or more speakers, and other suitable devices. Client platforms 106, 108, 110 may also be implemented with various peripherals for accepting input from a user, such as a keyboard, a mouse, and the like. Client platforms 106, 108, 110 are connected directly or indirectly to email server system 102 and messaging forum server system 118 via network 104.

Client applications 112, 114, 116 are operated by a user and owned by, managed by, operated by, or otherwise associated with an email server system 102. Thus, each email client application user has one or more assigned mail files on email system server 102 and a corresponding email address. Client applications 112, 114, 116 may also be referred to as email applications or simply clients and may be implemented in a variety of ways. Client applications 112, 114, 116 provide a user interface for email server system 102, and are used to compose, reply to, forward, and receive email messages. Each client application uses one or more network protocols to send and/or receive mail and one or more formats to represent mail. Client applications 112, 114, 116 may run under an operating system, such as the LINUX operating system, the Microsoft™ Windows operating system, and the like. Client applications 112, 114, 116 may also operate through an Internet browser application. In exemplary embodiments, client applications 112, 114, 116 can be any of a myriad of email clients, which can range from proprietary email clients (thick clients) to web-based interfaces that retrieve email messages in which the user agent function is provided by a Web server and/or a back-end program (for example, a CGI program) running on the same system as the corresponding email server. Examples of email client applications include Microsoft Outlook, IBM's Lotus Notes, Netscape Communicator (or Netscape 8.0), and the AOL 9.0 interactive service software (which includes the email function). Other examples of email client applications include Mozilla thunderbird, and web-mail clients such as gmail, hotmail, and the like.

Client platforms 106, 108, 110 may also implement software for and running a respective Internet browser application. Each browser application provides an interface to access information on network 108, such as information provided by messaging forum server system 118. A browser application may be, for example, Firefox by Mozilla, Internet Explorer by Microsoft Corporation, Netscape Navigator by Netscape Communications Corporation, and the like. Although, in this example, the email client applications and the browser application are shown as separate components, it shall be understood that these applications, as well as others, may be integrated in a single application component running on a client platform. Thus, in exemplary embodiments, the browser application can be integrated within same component as the email client application. For example, IBM's Lotus Notes client is primarily used as an email client, but also implements a browser application, an instant messaging client (for Lotus Sametime), notebook, and calendar/resource reservation client, as well as a platform for interacting with collaborative applications.

In the present exemplary embodiment, messaging forum server system 118 is implemented by forum server software running on a computer system, which can be, for example, a server computer, a workstation computer, a mainframe computer, or a super-computer. The computer system may also comprise a number of computers connected together via a network. Messaging forum server system 118 may therefore exist as multiple separate logical and/or physical units, and/or as multiple servers acting in concert or independently, wherein each server may be comprised of multiple separate logical and/or physical units. Furthermore, functionality described with reference to messaging forum server system 118 may be distributed to multiple locations, and even provided by more than one party.

Messaging forum server system 118 can be configured to interact with Web browser applications, non-Web browser applications, or both. Messaging forum server system 118 may also be configured to function autonomously. The functions of messaging forum server system 118 include managing the rendering and use of messaging forum Webpages (for example, blogs) by, for example, posting message submitted to messaging forums, notifying feed subscribers of the posting of recent messages, and providing subscribers with the requested messages. In exemplary embodiments, the messaging forums are hosted at a network address or domain that permits user interaction, including the rendering of messages and the uploading of new messages from posters. In exemplary embodiments, messaging forum server system 118 can comprise a processor, a network interface, and a memory. The processor performs the various operations of the messaging forum server system 118. The network interface provides an interface to receive communications from and send communications to network 104. The memory, serving generally as a computer readable medium, stores one or more software modules that control the processor in performing its various operations, as well as forum Webpages, posted messages, subscriber information, and possibly other forum related information and parameters.

In exemplary embodiments, messaging forum server system 118 is configured to receive communications from users that include a content for an electronic message forum hosted by the messaging forum server system. For example, the content may correspond to text and/or images, authored or selected by the individual (for example, an opinion, or a solicitation to buy or sell an item). Information about the communication or the individual making the post can be programmatically determined. A message is posted on the electronic message forum that is based on the content of the communication. The programmatically displayed information can then provided (for example, made available for display) with the posted message. In an exemplary embodiment, messaging forum server system 118 may post messages from a user by making the messages renderable on a web page that an individual can view using a Web browser application. The web page may be provided at a network location on the domain of the message forum provided by messaging forum server system 118, which the user can access using a Web browser. In exemplary embodiments, a message forum provided by messaging forum server system 118 can be rendered in part to provide a web page that displays a plurality of messages, where each message corresponds to a record derived from a communication that was once transmitted from an individual poster. Messaging forum server system 118 may organize messages in the message forum in various formats, including by category, thread (listing replies), and/or chronologically. Messaging forum server system 118 may include a database or other data structure that comprises records corresponding to the individual messages.

A format of posted messages on the forum may correspond to text, although images and media may also be included. A posting user may also insert links to other network locations or sites where other content is provided. Messaging forum server system 118 may provide the message forum in various different contexts and implementations. For example, the message forum may be provided on a web site that is dedicated to providing message forums. Alternatively, the message forum may be integrated into a web page, such as on a blog or home web page. Still further, one or more embodiments contemplate use of numerous message forums as part of a feature for enabling users to interact and discuss current events and news items. In the latter example, individual forums may be associated with news stories or categories, and users may comment by posting messages. In one approach, the message forum provides a user-interface feature to enable individuals to compose content (for example, text content) and to upload the content as a message. Such a message may be referred to as a post. The message forum may include user-interface features for enabling individuals to compose reply posts (reply messages to a message or topic already posted) or compose new posts on a given topic.

In exemplary embodiments, messaging forum server system 118 may also be operated by receiving an email message from an individual. The email message includes the content to be posted to an electronic message forum hosted by messaging forum server system 118. The message is received by messaging forum server system 118, which then displays a post on the electronic message forum that is based on the content of the email message. In exemplary embodiments, the email message can be addressed to an email address dedicated for receiving messages that contain content to be posted to a particular electronic message forum hosted by the messaging forum server system. For example, messaging forum server system 118 may be configured to permit a user to create or to otherwise provide a dedicated email account that is hosted by the messaging forum server system to be used for receiving messages to be posted to an electronic message forum, and to post messages received for the email address for the email account. In an alternative example, messaging forum server system 118 may permit a user to configure the messaging forum server system to access a dedicated email account that is hosted another mail server system to be used for receiving messages to be posting to an electronic message forum (for example, by providing the name of the mail server, the port number used by the mail server, and a username and password for an email account), and to retrieve and post messages addressed to the email address for the email account.

Messaging forum server system 118 may also be configured to permit a user to specify a particular electronic message forum to which messages addressed to the email address are to be posted, for example, by assigning a category to posts received for the email address. For example, messaging forum server system 118 may be configured to use the subject line of the email message as the category the post and to use the body section of the email message as the content of the post. After an initial email message that contains a particular string of characters in the subject line is received and posted to a particular message forum according to the subject line, any subsequent emails received containing the same particular string of characters in the subject line can be posted in the same message forum below the initial post and any other preceding posts on the message forum display, for example, as a comment. Information about the message or the individual sending the email message to post can be programmatically determined, for example, by examining the header information contained in the email message. The programmatically displayed information can then be provided (for example, made available for display) with the posted message.

In the present exemplary embodiment, email server system 102 is implemented by email server software running on a computer system, which can be, for example, a server computer, a workstation computer, a mainframe computer, or a super-computer. The computer system may also comprise a number of computers connected together via a network. Email server system 102 may therefore exist as multiple separate logical and/or physical units, and/or as multiple servers acting in concert or independently, wherein each server may be comprised of multiple separate logical and/or physical units.

In the present exemplary embodiment, email server system 102 includes an operating system 120, an application server 122, a messaging server 124, a message forum agent 126, and a user database 128. These components may be implemented as software, firmware, or some combination of both, which may be loaded into memory of the machine embodying email server system 102. The software components may be written in a variety of programming languages, such as C, C++, Java, etc.

In exemplary embodiments, email server system 102 can be configured to interact with non-web client applications, web client applications, or both. Email server system 102 may also be configured to function autonomously, that is, with no client. The functions of email server system 102 include managing email addresses, receiving email messages, delivering queued email messages to client applications, and forwarding email messages to their appropriate destinations. The user of each of email client applications 112, 114, 116 is registered with an email address, and email server system 102 is configured to forward messages among the client applications 112, 114, 116 based on email addresses specified in the messages.

User database 128 maintains information identifying the users of client applications 112, 114, 116. User database 128 can comprise one or more user information stores that contain information about each user of email client applications 112, 114, 116. The one or more information stores can be used to manage interactions between email server system 102 and client platforms 106, 108, 110. User database 128 may be implemented using database technology, such as relational databases, or object oriented databases. For example, user database 128 may comprise information related to authenticating a user determining the respective rights of a user relative to other users. For example, a user may select various groups or channels of content in which they are interested in receiving information. User database 128 may further include information that indicates the permissions and delivery of the information to the users. User database 210 may also include data structures to log the activities and transactions of its users.

Operating system (OS) 120 is an integrated collection of routines that service the sequencing and processing of programs and applications running in email server system 102. OS 120 may provide many services, such as resource allocation, scheduling, input/output control, and data management. OS 120 may be predominantly software, but may also comprise partial or complete hardware implementations and firmware. In addition, OS 120 may operate in conjunction with other software, such as that of application server 122, to implement various features of email server system. Application server 122 provides the logic for analyzing and managing the operations of email server system 102. The email server software of application server 122 may be, for example, the Microsoft Exchange email server software, IBM's Lotus Domino, the Sun/AOL iPlanet Messaging Server, or the like.

Messaging server 124 manages email communications between client platforms 106, 108, 110. Messaging server 124 is responsible for receiving and routing inbound and outbound email messages addressed to and from the email addresses corresponding one or more assigned mail files maintained by email server system 102 for the users of client applications 112, 114, 116. Messaging server 124 may comprise one or more of any type of general-purpose messaging gateway, also known as a Message Transfer Agent (MTA), mail relay, email relay, email router, Simple Mail Transfer Protocol (SMTP) server, QMQP server, or email gateway, which is specially programmed to perform email message routing functions. In exemplary embodiments, messaging server 124 can comprise any number of outbound, inbound, and intermediate messaging gateways, and the use of any number of such elements is contemplated. Messaging server 124 may therefore exist as multiple separate logical and/or physical units, and/or as multiple servers acting in concert or independently, wherein each server may be comprised of multiple separate logical and/or physical units Generally, when a message is delivered to a messaging gateway, the gateway must determine whether it can deliver the message locally to its own message store or if it must route the message to another messaging gateway. If the message is sent to another messaging gateway, the other messaging gateway must make the same decisions about the message—deliver locally or route to yet another messaging gateway. In this way, messages are routed throughout, for example, the Internet, until they reach the intended recipient. After a message is successfully delivered to and stored on the correct messaging gateway, the recipient can then retrieve the message. In exemplary embodiments, the systems of the one or more messaging gateways can be a server system such as, for example, SUN Ultra workstations running the SunOS operating system, IBM RS/6000 workstations and servers running the AIX operating system, or an IBM zSeries eServer running z/OS, z/VM or Linux OS.

In distributed processing environment 100, a user can operate a client application running on a client platform to compose email messages and to send the messages from a sending email address for delivery to a receiving email address. When a user having a particular email address logs into email server system 102 through the client application, the client application assumes the email address registered for the logged-in user. The client application then communicates with email server system 102 to receive all email messages sent to that particular email address using, for example, the Post Office Protocol (POP) or the Internet Message Access Protocol (IMAP). The user may also send email messages from that email address to other email addresses via the client application.

In the present exemplary embodiment, a mechanism promoting a deflection of information dissemination to a group and subsequent group communication from the use of group email communications to the use of message forums provided by messaging forum system server 118 is implemented within distributed processing environment 100. This mechanism is implemented as a combination of software components within client applications 112, 114, 116 and email server system 102 that interact through the use of email by the users of client systems 106, 108, 110 and communication between the client applications and the email server system. A non-limiting exemplary embodiment of such a mechanism will now be described with reference to distributed processing environment 100 illustrated in FIG. 1.

More specifically, client applications 112, 114, 116 are configured to provide email users with an option to designate an email message being composed for deflection to a message forum provided by messaging forum server 118 upon being sent (hereinafter, the "deflection option"). This option may be implemented to be accessible to email senders through the user interface provided by client applications 112, 114, 116. If a sender does not select this option to designate an email message for deflection to a message forum, the email message will be sent out for delivery to the intended recipient(s) through email server system 102 in the normal fashion. If, on the other hand, the sender does select this option, the email message will still be sent out for delivery to the intended recipient(s) through email server system 102. The sender's client application, however, will perform formatting of the message prior to sending the email message out for delivery that will indicate to email server 102 that the message is to be posted in a message forum provided by messaging forum system server 118 and allocated for the email message. This formatting can be implemented, for example, by setting the values of one or more fields of the header section of the email message.

Message forum agent 126 is configured to operate in conjunction with messaging server 124 to monitor email messages received by the messaging server from client applications 112, 114, 116. In particular, message forum agent 126 may be a computer application that runs continuously, as other programs are being run, and responds automatically upon reception of an email message being sent from a client application by messaging server 124. When a message that is sent from a client application is received at email server system 102 by messaging server 124, message forum agent 126 examines the message to determine if the deflection option is sent. If it is, message forum agent 126 accesses messaging forum server system 118 through its network interface via network 104 and directs messaging forum server system to post the content of the message to a new messaging forum as the initial post. Message forum agent 126 can be configured to direct messaging forum server system 118 to specify the topic of the message forum to match the subject of the email message provided by the sender and to provide an indication of the reply sender's identity using, for example, the local part of the sender's email address (for example, the sender's username) along with the posted content.

Message forum agent 126 is also configured to perform formatting of the message prior to routing the email message for delivery that will promote the deflection of subsequent threaded discussion by the intended recipient(s) of the subject matter or topic of the message to the message forum allocated for the email message on messaging forum server system 118. The formatting for promoting the deflection of subsequent threaded discussion by the intended recipient(s) to the message forum can be implemented, for example, by appending a hyperlink referencing the message forum to the email message. In exemplary embodiments in which messaging forum server system 118 enables individuals to compose reply or comment posts, the formatting performed by message forum agent 126 can also be implemented to further append a hyperlink to a reply or comment feed for the message forum. The comment feed can be syndicated, for example, by messaging forum server system 118, email host system 102 (using, for example, message forum agent 126 to access the messaging forum server system), or a separate content distribution entity. Message forum agent 126 can be configured to acquire the appended information from messaging forum server system 118 via network 104. Message forum agent 126 can further be configured to append or prepend an indication to the email message that the message has been sent with the deflection option set and posted to the particular message forum accordingly. In exemplary embodiments, message forum agent 126 can be configured to further format the message so that the message as delivered to the intended recipient(s) only contains the appended links or contains only the links to be appended along with a preview of summary of the message content. In exemplary embodiments, client applications 112, 114, 116 can be configured to provide the sender with another option to designate whether an message with the deflection option set should be formatted so that the message as delivered to the intended recipient(s) only contains the links to be appended by message forum agent 126 or contains only the links to be appended along with a preview of summary of the message content, and this option can be handled accordingly by message forum agent 126 in conjunction with message server 124 when the message is received by email host system 102. After message forum agent 126 has accessed messaging forum server system to post the email message to the message forum and formatted the message as described, messaging server 124 can route the message for delivery to the intended recipient(s) in a typical fashion.

As a result, when a recipient user's email client application receives or retrieves an email message sent with the deflection option set, the recipient can view the message and recognize that the message has been sent with the deflection option set and posted to the particular message forum accordingly. The recipient can then follow the appended link to the message forum using a browser application to access messaging forum server system 118 via network 104, and thereby view the message content, compose reply or comment posts, and view other reply or comment posts from other recipients. If the information appended by message forum agent 126 includes a link to a comment feed for the message forum, the recipient can subscribe to the feed by registering the feed link with an aggregator program or feed reader on the recipient's client platform, and thereafter utilize the aggregator program to check for new comments or replies posted to the message forum.

Upon receiving or retrieving an email message for a recipient user sent with the deflection option set, client applications 112, 114, 116 are configured to provide the recipient with an option to compose and designate a reply message to the received email for deflection to the message forum allocated for the received message upon being sent (hereinafter, the "post as comment option"). This option may be implemented to be accessible to reply message senders through the user interface provided by client applications 112, 114, 116. This option can be provided regardless of whether the reply sender elects to reply any or all of the other recipients and/or the sender of the original message. If a reply sender does not select this option to designate an email message for deflection to a message forum, the email message will be sent out for delivery to the intended recipient(s) through email server system 102 in the normal fashion. If, on the other hand, the sender does select this option, the reply sender's client application will perform formatting of the message prior to routing the email message for delivery that will indicate to email server 102 that the message is to be posted as a reply in the message forum allocated for the original email message by messaging forum system server 118. This formatting can be implemented, for example, by setting the values of one or more fields of the header section of the email message.

When a message that is sent from a client application is received at email server system 102 by messaging server 124, message forum agent 126 examines the message to determine if the post as comment option is set. If the post as comment option is not set, message forum agent 126 can permit messaging server 124 to route the message for delivery to the intended recipient(s) in a typical fashion. If the post as comment option is set, message forum agent 126 accesses messaging forum server system 118 via network 104 and directs messaging forum server system to post the content of the message as a reply or comment to the allocated message forum. Message forum agent 126 can be configured to direct messaging forum server system 118 to provide an indication of the reply sender's identity using, for example, the local part of the sender's email address (for example, the sender's username) along with the reply post. In exemplary embodiments, message forum agent 126 can also be configured to direct messaging server 124 to terminate delivery of the reply message to the intended recipients is the post as comment option is set. Alternatively, client applications 112, 114, 116 can be configured to provide the recipient with another option to designate whether a reply message with the post as comment option set should also be delivered to the intended recipients, and this option can be handled accordingly by message forum agent 126 in conjunction with message server 124 when the message is received by email host system 102.

It should be noted that the term "user" is used herein to refer to one who uses a computer system, such as one of client platforms 106, 108, 110. It should also be noted that the terms "client" and "server" are used herein to refer to a computer's general role as a requester of data (the client) or provider of data (the server). Further, the terms "sender" and "recipient" are used to refer to a client system user's general role as a sender of an email message (the sender) or as a receiver of an email message (the recipient). Additionally, each of client platforms 106, 108, 110 and email server system 102 may function as both a "client" and a "server" and may be implemented utilizing a computer system such as computer system 300, described below with reference to FIG. 3. Further, users of client applications 112, 114, 116 may function as both a "sender" and a "recipient" and typical email users will act as both. Still further, while exemplary embodiments are described herein with emphasis upon a message forum agent implemented within an email server system 102 controlling email communication between users of client applications 112, 114, 116 via network 104, the functions performed by the message forum agent can be implemented to be performed or partially performed within client platforms 106, 108, 110 in conjunction with client applications 112, 114, 116 or integrated as an aspect of the client applications in alternative exemplary embodiments. For example, client applications 112, 114, 116 can be configured to access messaging forum server system 118 to perform certain functionality described in the above exemplary embodiment as being performed by message forum agent 126. Furthermore, exemplary embodiments of the present invention can be implemented within other suitable types of distributed processing systems.

Aspects of exemplary embodiments of the present invention can be implemented as an aspect of a software package for an email system, or as a software module or component implemented for incorporation with an email system as, for example, one or more libraries of functions, one or more plug-in or extension modules, one or more dynamic linklibraries, etc. For example, the message forum agent may be implemented as an integral part of one or more aspects of an email system such as the client applications or the email server system, or the message forum agent may be implemented as a plug-in, add-on, or extension software module for installation within the client applications, the email server system, or both.

Figure 2:
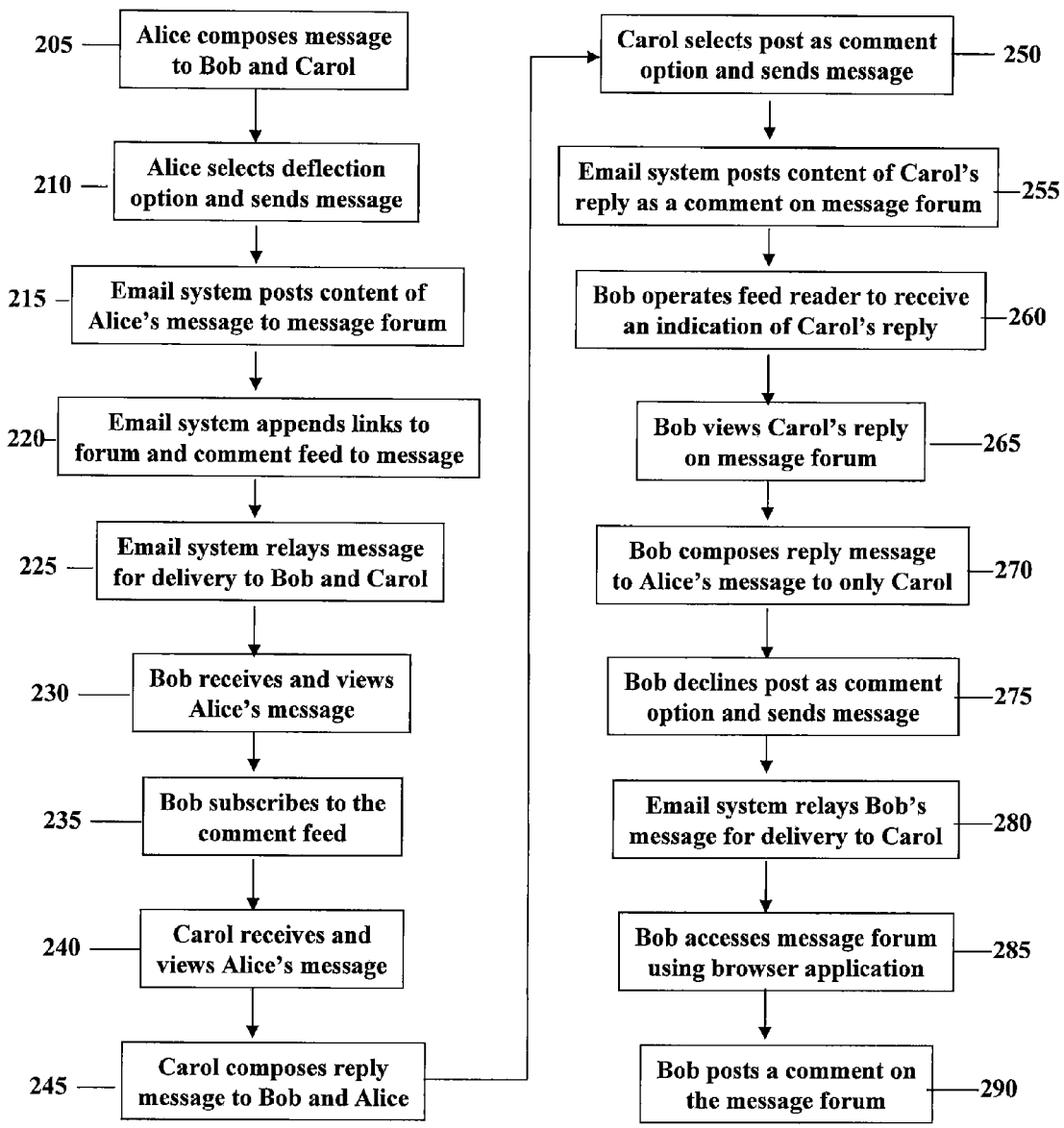
FIG. 2 is a flow diagram illustrating an example of a general sequence of email exchange performed within an email system implementing an exemplary embodiment of the present invention.

Referring now to FIG. 2, a flow diagram illustrating an example of a sequence 200 of email exchange performed by hypothetical users Alice, Bob, and Carol within an email system implementing an exemplary embodiment of the present invention is provided. Example sequence 200 begins at block 205, with Alice accessing her email client application to compose an email message with Bob and Carol specified as the intended recipients. At block 210, Alice elects to select the deflection option and sends the message to Bob and Carol. At block 215, the email system accesses a messaging forum system server to have the content of the message posted to a message forum. At block 220, the email system formats the message to include a hyperlink to the message forum and a hyperlink to a comment feed for the message forum. At block 225, the email system relays the formatted message for delivery to Bob and Carol.

At block 230, Bob's email client application receives the message and Bob views the message. At block 235, Bob subscribes to the comment feed by registering the feed link with a feed reader application on Bob's client platform. At block 240, Carol's email client application receives the message and Carol views the message. At block 245, Carol selects the "reply to all" option in her email client application and composes a reply message. At block 250, Carol elects to select the post as comment option and sends the message with Alice and Bob specified as the intended recipients. At block 255, the email system accesses the messaging forum system server to have the content of the message posted as a comment on the message forum allocated for Alice's message.

At block 260, Bob operates the feed reader application on his client platform to check for new content posted to the message forum allocated for Alice's message and receives an indication of Carol's comment post. At block 265, Bob views Carol's post on the messaging forum using a browser application on his client platform. At block 270, Bob composes a reply to Alice's message in his email client application specifying Carol as the sole recipient. At block 275, Bob declines to select the post as comment option and sends the message for delivery to Carol. At block 280, the email system routes the message for delivery to Carol. At block 285, Bob uses his browser application to access the messaging forum system server and view content posted to the message forum allocated for Alice's message. At block 290, Bob posts a comment on the message forum using the functionality provided by the messaging forum system server.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 3:
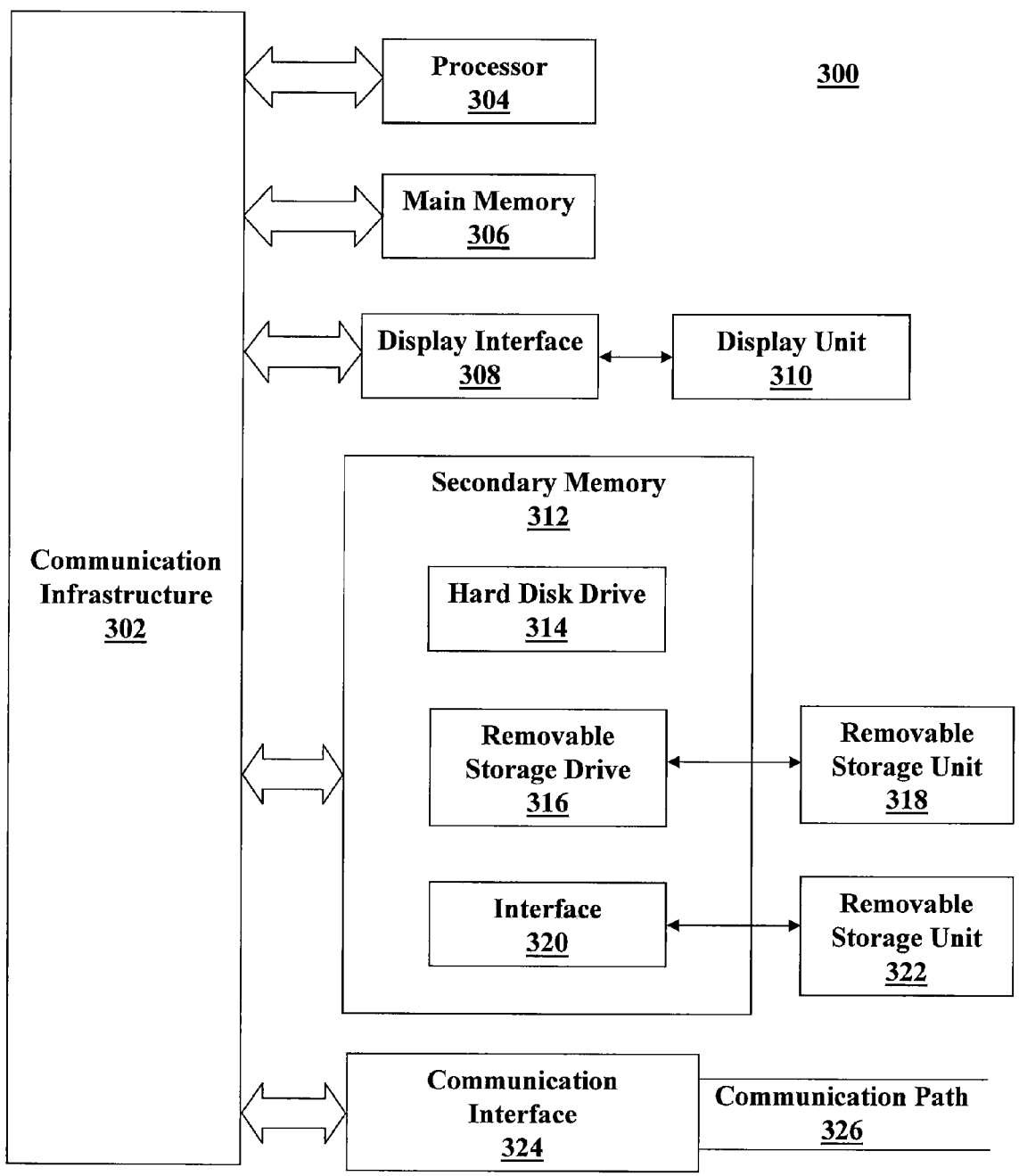
FIG. 3 is a block diagram illustrating an exemplary computer system that can be used for implementing exemplary embodiments of the present invention.

FIG. 3 is a block diagram of an exemplary computer system 300 that can be used for implementing exemplary embodiments of the present invention. Computer system 300 includes one or more processors, such as processor 304. Processor 304 is connected to a communication infrastructure 302 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 300 can include a display interface 308 that forwards graphics, text, and other data from the communication infrastructure 302 (or from a frame buffer not shown) for display on a display unit 310. Computer system 300 also includes a main memory 306, which can be random access memory (RAM), and may also include a secondary memory 312. Secondary memory 312 may include, for example, a hard disk drive 314 and/or a removable storage drive 316, representing a floppy disk drive, a magnetic tape drive, an optical disk drive, etc. Removable storage drive 316 reads from and/or writes to a removable storage unit 318 in a manner well known to those having ordinary skill in the art. Removable storage unit 318, represents, for example, a floppy disk, magnetic tape, optical disk, etc. which is read by and written to by removable storage drive 316. As will be appreciated, removable storage unit 318 includes a computer usable storage medium having stored therein computer software and/or data.

In exemplary embodiments, secondary memory 312 may include other similar means for allowing computer programs or other instructions to be loaded into the computer system. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, a PCMCIA slot and card, etc. Software and data transferred via communications interface 324 are in the form of signals which may be, for example, electronic, electromagnetic, optical, or other signals capable of being received by communications interface 324. These signals are provided to communications interface 324 via a communications path (that is, channel) 326. Channel 326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 306 and secondary memory 312, removable storage drive 316, a hard disk installed in hard disk drive 314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also called computer control logic) are stored in main memory 306 and/or secondary memory 312. Computer programs may also be received via communications interface 324. Such computer programs, when executed, can enable the computer system to perform the features of exemplary embodiments of the present invention as discussed herein. In particular, the computer programs, when executed, enable processor 304 to perform the features of computer system 300. Accordingly, such computer programs represent controllers of the computer system.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for deflecting threaded email discussions to electronic message forums, the method comprising:

providing a first user, the first user operating an email client application to send a first email message addressed to one or more recipient users, with a first option to designate the first email message for posting to an electronic message forum hosted by a messaging forum server, the first option being provided through a user interface implemented within the email client application, the one or more recipient users including a second user operating the email client application;

accessing the messaging forum server to post a content of the first email message to the electronic message forum if the first user has sent the first email message with the first option selected;

formatting the first email message to append a hyperlink to the electronic message forum and a hyperlink to a comment feed syndicated for the message forum;

routing the first email message for delivery to the one or more recipient users;

providing the second user with a second option to designate a second email message composed in reply to the first email message for posting to the electronic message forum if the first user has sent the first email message with the first option selected, the second option being provided through a user interface implemented within the email client application upon receipt of the first email message by the second user; and accessing the messaging forum server to post a content of the second email message to the electronic message forum as a comment if the second user has sent the second email message with the second option selected.

* * * * *